(No Model.)

G. W. MISKIMEN.
SEEDING MACHINE.

No. 312,148. Patented Feb. 10, 1885.

WITNESSES:
Fred. G. Dieterich.
Maurice Delmar.

George W. Miskimen
INVENTOR.
By Louis Bagger & Co.
ATTORNEYS.

UNITED STATES PATENT OFFICE.

GEORGE W. MISKIMEN, OF NEWCOMERSTOWN, OHIO.

SEEDING-MACHINE.

SPECIFICATION forming part of Letters Patent No. 312,148, dated February 10, 1885.

Application filed October 18, 1884. (No model.)

*To all whom it may concern:*

Be it known that I, GEORGE W. MISKIMEN, a citizen of the United States, and a resident of Newcomerstown, in the county of Tuscarawas and State of Ohio, have invented certain new and useful Improvements in Seeding-Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
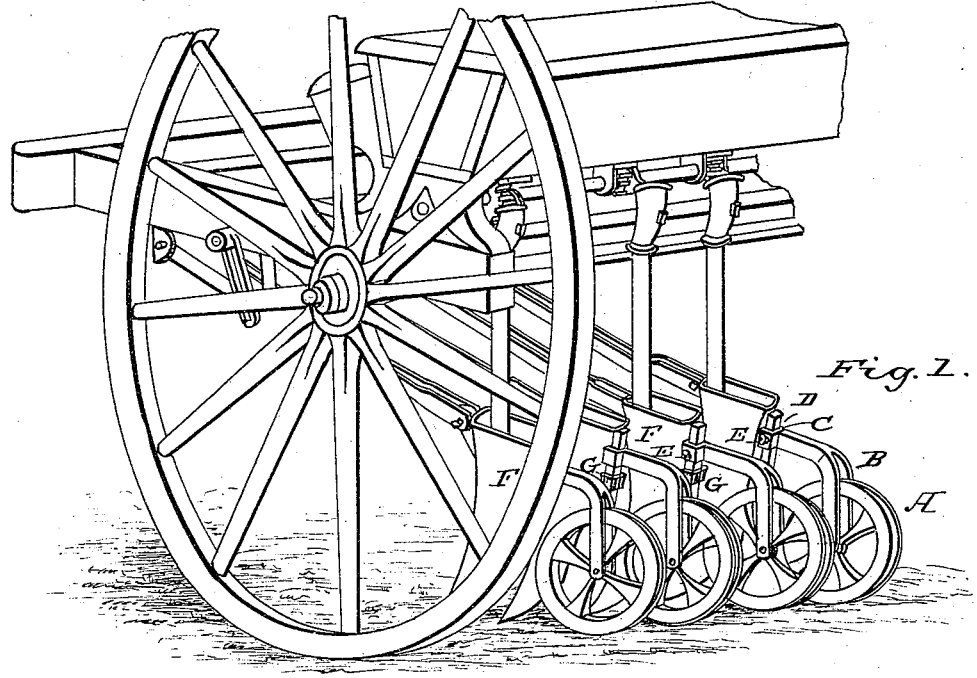
Figure 2:
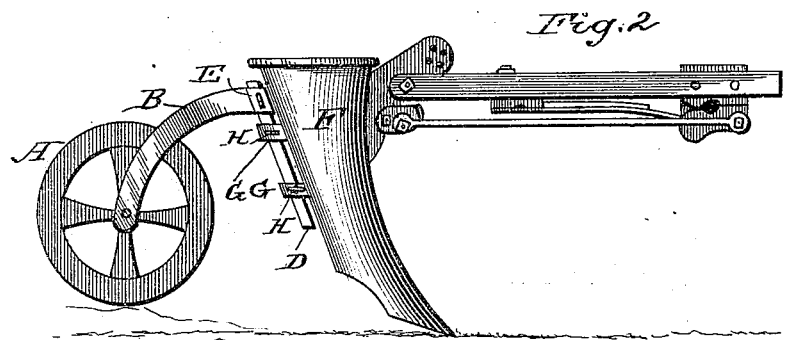
Figure 3:
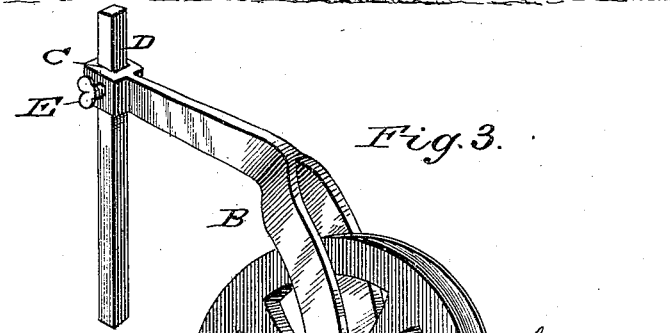

Figure 1 is a perspective view of a portion of a seed-drill provided with my improvement. Fig. 2 is a side view of one of the drills with its adjustable attachment which constitutes my improvement, and Fig. 3 is a perspective detail view of the attachment detached from the drill.

Similar letters of reference indicate corresponding parts in all the figures.

My invention has relation to seeding-machines of the class commonly known as "grain-drills;" and it consists in the attachment, which will be hereinafter more fully described and claimed, whereby the depth of the hoes or shovels which form parts of the drill may be regulated, according to the nature of the soil, so as to force the shovels down deeper into hard ground than when the soil or ground is soft. I accomplish this by means of a weighted wheel or roller, A, made of iron or other suitable material, with, preferably, a convexo-concave rim. This wheel is journaled in a bent fork, B, the converging ends or shank of which form an eye, C, through which is inserted a rod, D, which may be adjusted in the eye C, and fixed in any given position therein by means of a set-screw, E. The drills F are provided with rearwardly-projecting sockets G, adapted for the insertion of the rod D, and having set-screws H, whereby the rod may be fastened in said sockets. I prefer to make the rod D and sockets G square in cross-section, so that the rod will be prevented from turning sidewise in the sockets.

From the foregoing it will be seen that the wheel or roller A will always run true in the track of the drill, and that it may be raised or lowered by adjusting the set-screws H and E. As the roller runs upon the surface of the ground it will be seen that the depth of the drill may be adjusted by raising or lowering the roller. The higher this is raised the deeper will the drill go into the soil, and vice versa. The rim of the roller also serves to cover the seed as it is being planted, and presses the soil over it. If desired, the rod D may be made in one part with the fork B, in which case the upper set-screw, E, is of course dispensed with.

I am aware that rollers or drag-shoes have been secured adjustably to the rear of the drill-tubes in seeding-machines, and I do not wish to make any broad claim for the same; but

I claim—

The combination of the drill F, having rearwardly-projecting sockets G, provided with set-screws H, rod D, weighted wheel or roller A, having a concave rim, and forked bearing B, having an eye, C, provided with a set-screw, E, substantially as and for the purpose shown and set forth.

In testimony that I claim the foregoing as my own I have hereunto affixed my signature in presence of two witnesses.

GEORGE W. MISKIMEN.

Witnesses:
OSCAR C. TUFFORD,
JAMES K. MULVANE.